United States Patent
Arie et al.

(10) Patent No.: US 8,002,560 B2
(45) Date of Patent: Aug. 23, 2011

(54) MOVABLE AUDIO-VISUAL COMPONENT SYSTEM AND METHOD

(75) Inventors: Isamu Arie, Santa Monica, CA (US); Fumiya Matsuoka, Torrance, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1158 days.

(21) Appl. No.: 11/557,951

(22) Filed: Nov. 8, 2006

(65) Prior Publication Data

US 2008/0107284 A1 May 8, 2008

(51) Int. Cl.
*H01R 13/60* (2006.01)
(52) U.S. Cl. ........................................ 439/120
(58) Field of Classification Search .......... 439/12, 439/117, 118, 116, 210, 211, 122, 120; 174/97, 174/507, 482; 381/87
See application file for complete search history.

(56) References Cited

U.S. PATENT DOCUMENTS

| | | | |
|---|---|---|---|
| 2,673,967 A | 3/1954 | Hedgecock, D.M. | |
| 5,000,286 A | 3/1991 | Crawford et al. | |
| 5,342,204 A | 8/1994 | Och | |
| 5,444,194 A | 8/1995 | Reinke | |
| D367,476 S | 2/1996 | Martin | |
| 5,603,621 A | 2/1997 | Elmouchi | |
| 5,812,796 A | 9/1998 | Broedner et al. | |
| 5,915,980 A | 6/1999 | Baldock | |
| 5,946,401 A | 8/1999 | Ferren | |
| 6,464,516 B2 | 10/2002 | Baldock | |
| D467,897 S | 12/2002 | Lin | |
| D477,829 S | 7/2003 | Hussaini et al. | |
| D477,830 S | 7/2003 | Hussaini et al. | |
| 6,587,739 B1 | 7/2003 | Abrams et al. | |
| 6,703,962 B1 | 3/2004 | Marics et al. | |
| 6,797,885 B2 * | 9/2004 | Magyar et al. | 174/97 |
| 6,923,684 B2 * | 8/2005 | Strayer | 439/652 |
| 7,095,867 B2 | 8/2006 | Schul et al. | |
| 7,130,432 B2 | 10/2006 | Lee et al. | |
| 7,140,584 B2 | 11/2006 | Bourque et al. | |
| D550,650 S | 9/2007 | Patel et al. | |
| D561,175 S | 2/2008 | Zhang | |
| 7,679,524 B2 | 3/2010 | Hofer et al. | |
| 2004/0032958 A1 | 2/2004 | Park | |
| 2005/0185801 A1 | 8/2005 | McCarty et al. | |
| 2006/0109134 A1 | 5/2006 | Aisa | |
| 2007/0229215 A1 | 10/2007 | Jha | |
| 2008/0106885 A1 | 5/2008 | Arie et al. | |
| 2008/0107284 A1 | 5/2008 | Arie et al. | |

OTHER PUBLICATIONS

Huang Wenwei et al.; Benq Corp. (CN); Audio-Visual Broadcasting Displaying Device With Media Access Assembly Separation; Chinese Patent Publication; Sep. 22, 2004, Pub. No. CN1530959.
Michinori et al.; Matsushita Electric Ind Co Ltd.; Information Wall Socket; Japanese Patent Abstract; Oct. 6, 2000; Pub. No. 2000-278292.

(Continued)

*Primary Examiner* — Alexander Gilman
(74) *Attorney, Agent, or Firm* — Fitch, Even, Tabin & Flannery

(57) ABSTRACT

An audio-visual ("A/V") system includes one or more A/V components, each one of which can be attached to a wall using a bracket or support bar. Each support bar enables the transfer of power signals and control signals (including media data) to each of the A/V components. Instead of wires, each A/V component includes one or more contact or conductive surfaces that abut corresponding surfaces on the support bar in order to receive power and transfer control signals among other A/V components.

24 Claims, 7 Drawing Sheets

OTHER PUBLICATIONS

Hiroshi et al.; Onkyo Corp.; Wiring Rail and Audiovisual System Using the Same; Japanese Patent Abstract; Feb. 21, 2003; Pub No. 2003-051687.

Hiroyuki et al.; Matsushita Electric Works Ltd.; AV Plug Socket; Japanese Patent Abstract; Mar. 4, 1994; Pub. No. 06-060950.

Isamu Arie, U.S. Appl. No. 11/557,925, filed Nov. 8, 2006.

Non-Final Office Action from U.S. Appl. No. 11/557,925 mailed Apr. 7, 2010.

Non-Final Office Action from U.S. Appl. No. 11/554,886 mailed Apr. 1, 2010.

"BeoCenter 2 User Guide;", Bang & Olufsen website; http://www.bang-olufsen.com/beocenter2; downloaded Aug. 13, 2009; 44 pages.

Final Office Action from U.S. Appl. No. 11/554,886 mailed Sep. 28, 2010.

Final Office Action from U.S. Appl. No. 11/557,925 mailed Sep. 30, 2010.

Non Final Office Action from U.S. Appl. No. 11/557,925 mailed Feb. 25, 2011.

Non Final Office Action, mailed Apr. 14, 2011, from U.S. Appl. No. 11/554,886.

* cited by examiner

MOVABLE AUDIO-VISUAL COMPONENT SYSTEM AND METHOD

CROSS REFERENCE TO RELATED APPLICATIONS

This application is related to U.S. application Ser. No. 11/557,925, filed Nov. 8, 2006 and entitled "Apparatus and Method for Mounting Audio-Visual Components," which such application is incorporated herein by reference.

FIELD OF INVENTION

This relates to audio-visual entertainment systems, and more particularly, to apparatuses and methods for installing and interconnecting entertainment system components.

BACKGROUND

Many popular audio-visual ("A/V") entertainment systems are comprised of separate modules or components, such as for example, audio speakers, hard disk drive recorders, LCD display screens, optical disk players (e.g., CD players or DVD players), controllers, tuners and video projectors, etc. These A/V components typically are interconnected by wires or cables. Frequently, however, these components require differing connection standards and cables, thus making assembly of these systems quite complex.

Moreover, many known A/V components are box-shaped with user controls disposed on the front surface or top surface, and have a myriad of cables extending from the components. Such an assembly frequently does not have an aesthetically-pleasing appearance, thus motivating some users to purchase expensive cabinetry or other furniture in which to place the A/V components and cables out of view.

Once the A/V components are interconnected with the various cables and placed in the cabinetry or other furniture, the components tend to remain statically so placed. It often is too much effort for a user to re-arrange the A/V components or move them into another location within the same room, house, etc., and therefore many users will not expend the effort to re-arrange or move these A/V components, although it may be desirable to do so.

There is a need therefore for an improved A/V component layout and mounting system having an enhanced aesthetic appearance, as well as an ease of assembly, movement and re-arrangement.

SUMMARY OF THE ILLUSTRATED EMBODIMENTS

One embodiment of the invention includes an A/V system comprised of one or more A/V components. Every A/V component of the system is attached to a wall bracket or support bar that enables the transfer of power signals and control signals (including media data) to each of the A/V components. Instead of wires, each A/V component includes one or more contact or conductive surfaces that abut corresponding conductive surfaces on the support bar in order to receive power and transfer control signals (including media data) among other A/V components.

In one aspect, an A/V component is for use with A/V content and for use with a support bar having a support bar conductive surface. The support bar defines a channel and is adapted for attachment to a structure surface. The A/V component comprises a housing having a hook-shaped portion adapted to mate with the channel. The housing is configured to be supported by the support bar when the hook-shaped portion is mated with the channel and when the support bar is attached to the structure surface.

A component first conductive surface is disposed on the housing and adapted to abut the support bar conductive surface when the hook-shaped portion is mated with the channel. Electronic circuitry is disposed within the housing and electrically connected to the component first conductive surface. The electronic circuitry is for processing a control signal for using the A/V content. The component first conductive surface and the support bar conductive surface are adapted to transmit a power signal or the control signal.

In another aspect, the A/V component is a digital video recorder, a DVD player, an amplifier, a speaker, a television tuner, an A/V controller, or a CD player.

In yet another aspect, the A/V component housing has a front face and a rear face, wherein the rear face includes the hook-shaped portion of the housing, and wherein the front face has a concave shape. The concave-shaped front face is formed by an upper surface and a lower surface, each of which has cross section that defines an approximately 90-degree arc of an imaginary circle.

In another aspect, the A/V component housing defines a housing channel having a channel wall. The hook-shaped portion of the housing defines at least a portion of the channel wall. The hook-shaped portion and the housing channel are configured to form a handle for carrying the A/V component.

Another embodiment of the invention is a method of moving A/V components. A plurality of support bars are attached to a structure surface. Each of the support bars defines a support bar channel and has a support bar first conductive surface. A plurality of A/V components is mounted onto the support bars. Each of the A/V components has a hook-shaped portion adapted to mate with the support bar channel of any one of the support bars.

Each of the A/V components further has a component first conductive surface disposed on the A/V component and adapted to abut the support bar first conductive surface of any one of the support bars when the A/V component is mounted on the support bar. Each of the A/V components further has electronic circuitry that is electrically connected to the component first conductive surface. The electronic circuitry is for processing a control signal for using A/V content. A power signal or the control signal is transmitted between the component first conductive surface of one of the A/V components and the support bar first conductive surface of one of the support bars.

In one aspect, the plurality of A/V components includes a first A/V component and a second A/V component, and the plurality of support bars includes a first support bar defining a first support bar channel and a second support bar defining a second support bar channel. The step of mounting the A/V components onto the support bars includes mounting the first A/V component onto the first support bar and mounting the second A/V component onto the second support bar.

Next, the first A/V component is removed from the first support bar, and the second A/V component is removed from the second support bar. Then the first A/V component is mounted onto the second support bar, and the second A/V component is mounted onto the first support bar. The control signal then is transmitted between the first and second A/V components via the first and second support bars when the first A/V component is mounted on the second support bar and the second A/V component is mounted on the first support bar.

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

Figure 1:
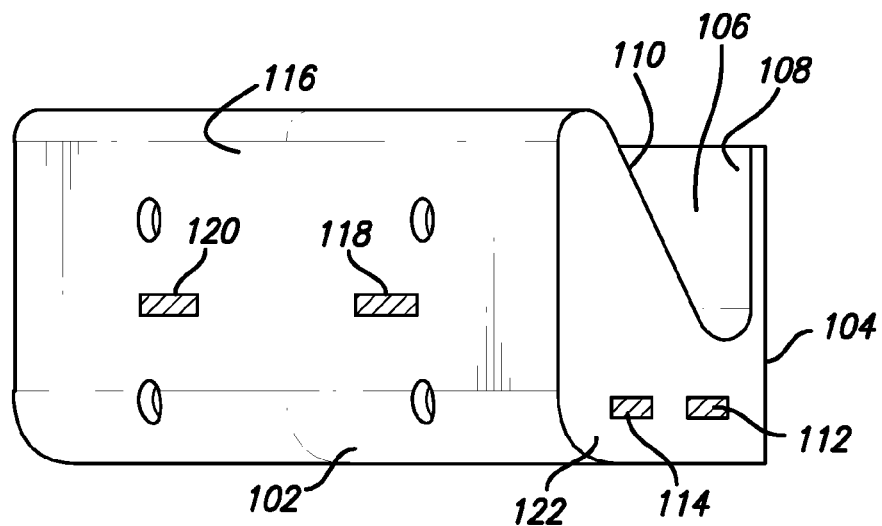
FIG. 1 is a side perspective view of a support bar in accordance with one embodiment of the invention.

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

Embodiments of the invention generally relate to a bracket or support bar system for installing a system of A/V components and which overcomes the cumbersome network of cables and wiring connections that exist in many known systems. Every A/V component or module of the system is attached to a wall bracket or support bar that enables the transfer of power signals and control signals (including media data) to each of the A/V components. The support bar holds each A/V component via a hook-shaped structure to exchange data and to have access to power.

The support bar can be combined with one or more other support bars to create a long stretch of bars or brackets thus providing an ability to place all of the components onto one combined support bar. Instead of wires, each A/V component carries one or more unique contact or conductive surfaces that abut corresponding surfaces on a support bar in order to receive power and transfer control signals (including media data) among other A/V components. In addition some A/V components, such as speakers, can be wireless. The presence of a hook shaped structure on the rear side of each A/V component facilitates the ability to carry the component from one place to another.

Figure 2:
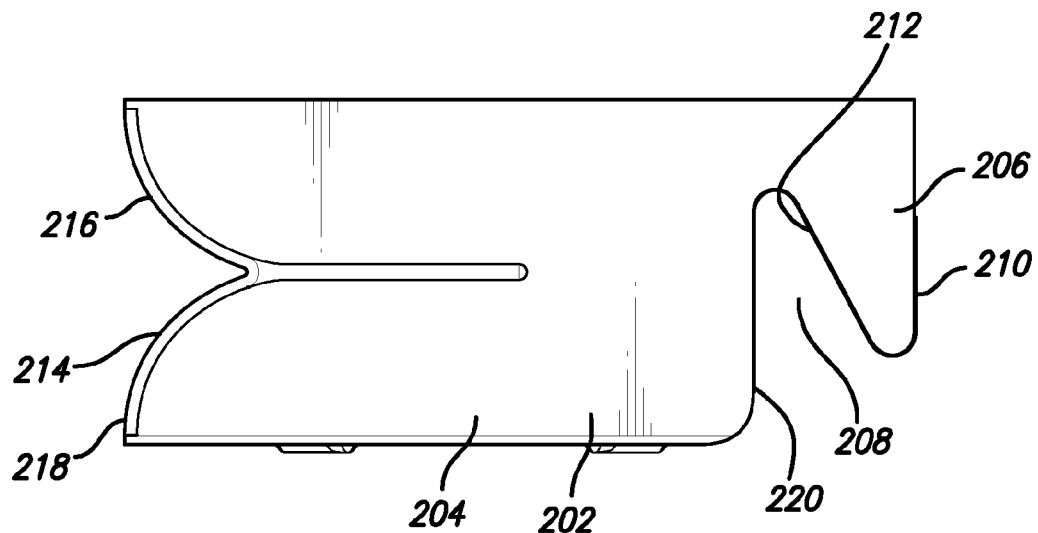
FIG. 2 is a side view of an A/V component in accordance with an embodiment of the invention.
Figure 3:
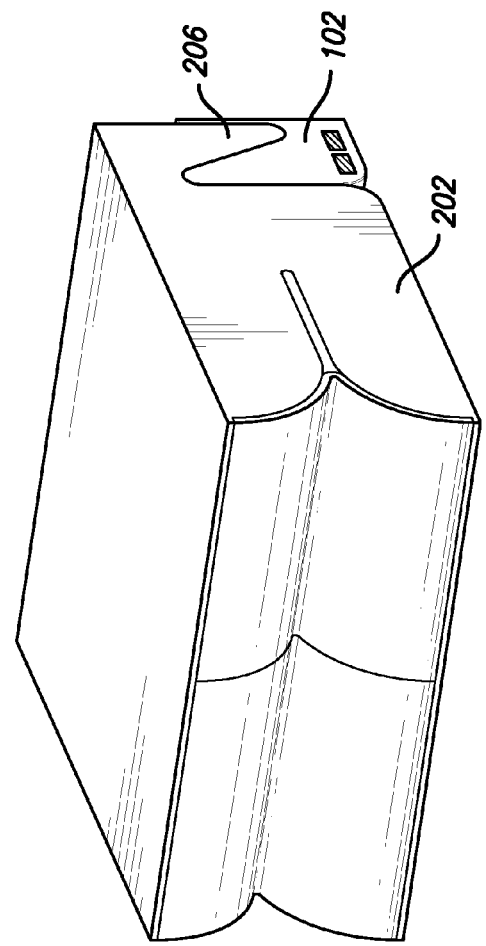
FIG. 3 is a side perspective view of the A/V component of FIG. 2 mounted on the support bar of FIG. 1.

Referring now to FIGS. 1-3, there is shown a support bar 102 for securing an A/V component 202 to a structure surface, such as for example a wall of a dwelling, according to one embodiment of the invention. The A/V component 202 is for using A/V content and can be any electronic component that stores, reproduces, amplifies, produces or otherwise uses the A/V content. Examples include a digital video recorder, a DVD player, an amplifier, a speaker, a television or radio tuner, an LCD display (for television or video viewing, etc.), an A/V controller, a CD player, etc.

In the illustrated embodiment, the support bar 102 is about four inches in height and thus is easily held by one hand of a user. The support bar 102 can be attached directly to the structure surface, and thus has a support bar distal surface 104 adapted to abut the structure surface. The support bar 102 further has a support bar proximate surface 116 that is opposite to and generally parallel with the distal surface 104, and two sidewalls 122 (i.e., one on each end of the support bar 102) connecting the proximate surface 116 with the distal surface 104. The support bar 102 defines a channel 106 that is disposed between the proximate and distal surfaces 104, 116 and that extends down the support bar 102 in a generally longitudinal direction and has a generally V-shaped cross-section. The channel 106 is further defined by a channel distal surface 108 that is generally parallel to the support bar distal surface 104 and a channel proximate surface 110 that tapers away from the channel distal surface 108 as the channel proximate surface 110 extends upwardly.

The support bar 102 further includes first and second conductive surfaces 118, 120 disposed on the support bar proximate surface 116, third and fourth conductive surfaces 112, 114 disposed on one sidewall 122, and fifth and sixth conductive surfaces (not shown in FIG. 1) disposed on the opposite sidewall 122 (not shown). These conductive surfaces will be described in further detail below.

In the illustrated embodiment, the A/V component 202 is about four inches in height and thus is easily held by one hand of a user. As best seen in FIG. 2, the A/V component 202 includes a housing 204 having a front face 214 and a rear face 210. The front face 214 has a concave shape formed by an upper face surface 216 and a lower face surface 218, wherein each front face surface 216, 218 has cross section that defines an approximately 90-degree arc of an imaginary circle.

The A/V component housing 204 further has a hook-shaped portion 206 adapted to mate in an interlocking fashion with the support bar channel 106 as best seen in FIG. 3. The housing rear face 210 forms one wall of the hook-shaped portion 206 and is generally parallel with the support bar channel distal surface 108 and therefore abuts the channel distal surface 108 when the A/V component 202 is mated with the support bar 102. Another wall of the hook-shaped housing portion 206 is formed by a housing channel first surface 212 that is disposed between housing front face 214 and the housing rear face 210 and that tapers away from the housing rear face 210 as the channel first surface 212 extends upwardly. A housing channel second surface 220 is disposed between the housing front face 214 and the housing channel first surface 212. The housing channel second surface 220 is generally parallel with the housing rear face 210, and along with the housing channel first surface 212, defines a housing channel 208 having a generally V-shaped cross section and extending the width of the A/V component 202. The A/V component 202 further includes two conductive surfaces (not shown in FIG. 2) disposed on the housing channel second surface 220, the operation of which will be described further below. These A/V component conductive surfaces are positioned so that they abut the support bar first and second conductive surfaces 118, 120 when the A/V component 202 is mated with the support bar 102.

Figure 5:
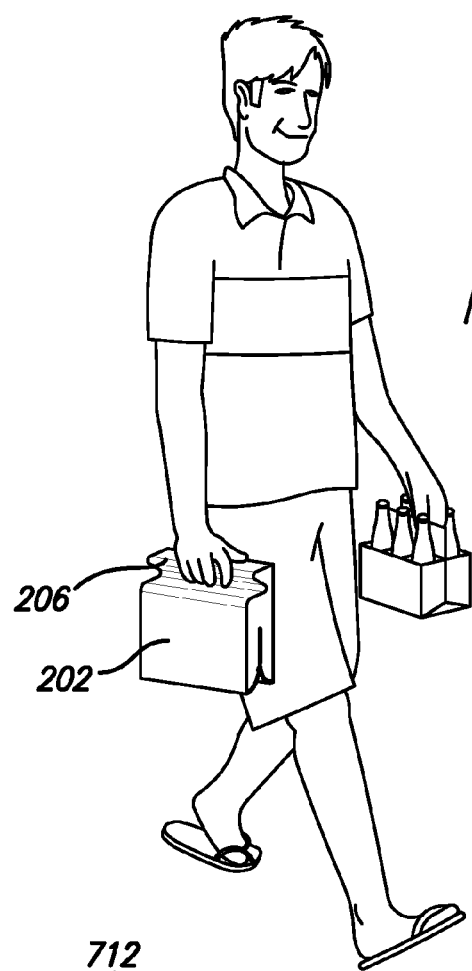
FIG. 5 is a diagram of a user carrying the A/V component of FIG. 2.

When the support bar 102 is attached to the structure surface, the configuration of the A/V component housing 204 allows the A/V component 202 to be quickly and easily mounted on and supported by the support bar 102 and without the use of any other clips, bolts, screws or other external fastening devices, and without the need for external cables running between the A/V component and the support bar. Moreover, this configuration of the hook-shaped portion 206 and the housing channel 208 advantageously forms a handle for convenient carrying of the A/V component 202 by a user, as shown in FIG. 5.

Figure 4:
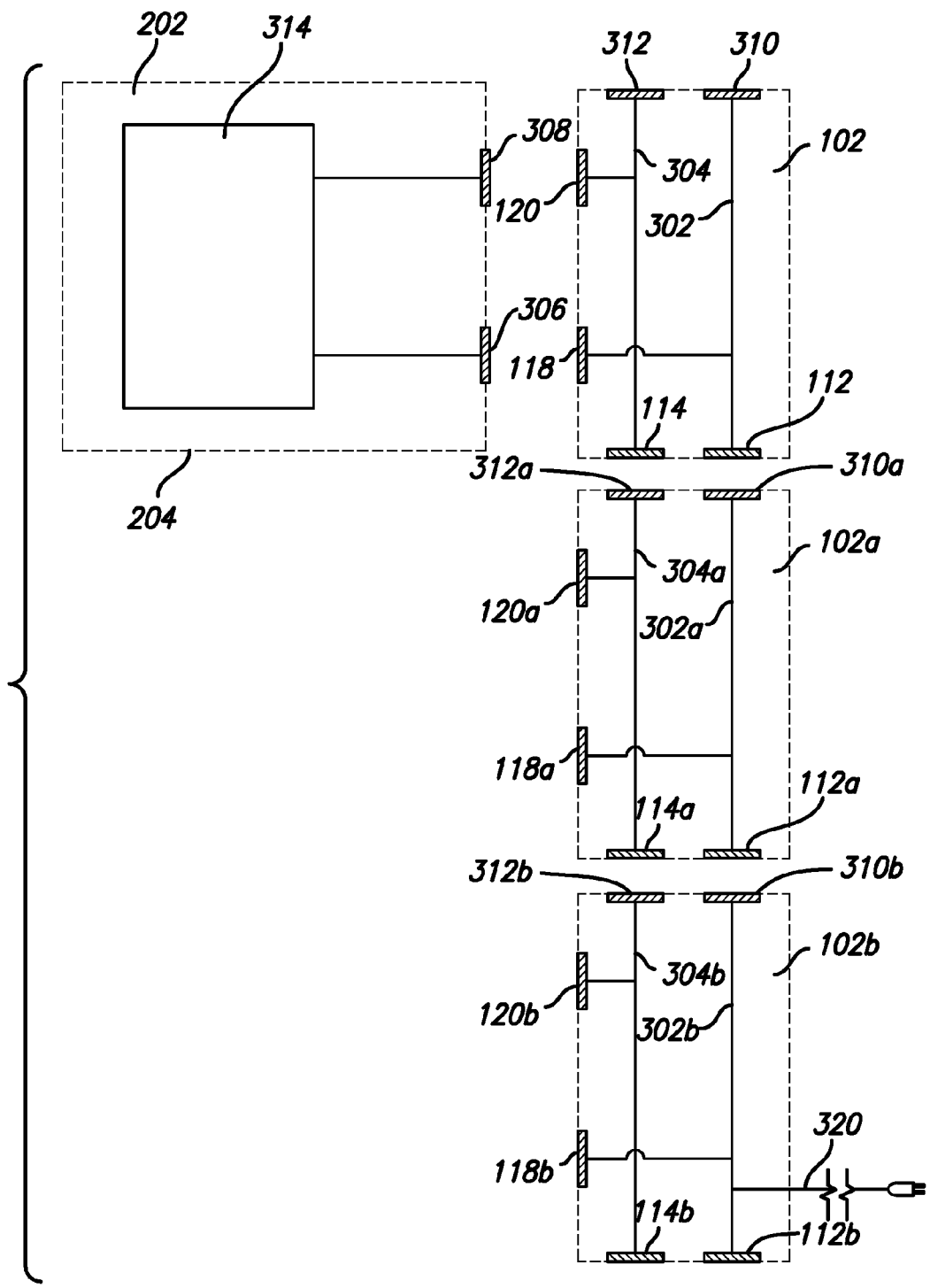
FIG. 4 is a functional block diagram of electrical components according to an embodiment of the invention.

FIG. 4 is a functional block diagram of certain electrical components of the A/V component 202, the support bar 102 and of a plurality of additional support bars, according to an embodiment of the invention. Referring to FIG. 4, shown is the support bar 102 of FIG. 1, as well as two other support bars 102a, 102b having essentially the same construction. Also shown is the A/V component 202 of FIG. 2. Enclosed within the support bar 102 are a first electrical bus 302 for transmitting a power signal for use by the A/V component 202 and a second electrical bus 304 for transmitting a control signal for use by the A/V component 202 in controlling the use of A/V content or for transmitting A/V content data.

The first bus 302 is connected to the first conductive surface 118 disposed on the support bar proximate surface 116 (FIG. 1). Similarly, the second bus 304 is connected to the second conductive surface 120 also disposed on the support bar proximate surface 116. In order to make an electrical connection when the A/V component 202 is received by the support bar channel 106, the support bar first and second conductive surfaces 118, 120 are oriented so that they abut or contact an A/V component first conductive surface 306 and second conductive surface 308, respectively, disposed on the A/V component channel second surface 220 (FIG. 2). Enclosed within the A/V component housing 204 is electronic circuitry 314 that is electrically connected to the A/V component first and second conductive surfaces 306, 308 and that is for processing control signals or data for using the A/V content.

Rather than being enclosed within the support bar 102, in other embodiments the first and second electrical buses 302, 304 are disposed on the surface of the support bar 102 or embedded within the material forming the support bar 102. Also, in alternative embodiments, the first and second support bar conductive surfaces 118, 120 are disposed on the support bar channel proximate surface 110 or the channel distal surface 108, and therefore the corresponding A/V component first and second conductive surfaces 306, 308 are disposed on the A/V component channel first surface 212 or the A/V component rear face 210, as necessary to make electrical connections.

Still referring to FIG. 4, also electrically connected to the first and second electrical buses 302, 304 are, respectively, support bar third and fourth conductive surfaces 112, 114 disposed on the surface of one of the support bar sidewalls 122 (FIG. 1), and fifth and sixth conductive surfaces 310, 312 disposed on the surface of the opposite support bar sidewall. These third, fourth, fifth and sixth conductive surfaces 112, 114, 310, 312 are configured to abut or contact corresponding conductive surfaces on the sidewalls of other support bars, such as the support bars designated by reference numerals 102a, 103b in FIG. 4, when two or more support bars are attached to the structure surface adjacent to one another, thereby effectively extending the first and second electrical buses 302, 304 to the other support bars 102a, 102b. In the embodiment of FIG. 4 only one support bar, i.e. the support bar designated by reference numeral 102b, has an external power cable 320 for connecting an external power source to the first electrical bus 302b, since the first electrical bus 302b can supply the remaining first electrical buses 302, 302a of the other support bars 102, 102a. Thus only a single power cable is needed for the entire system.

While the illustrated conductive surfaces described above are generally rectangular in shape, in alternative embodiments, they can take various forms and encompass various dimensions and geometries. According to one embodiment, the conductive surfaces on each support bar and A/V component housing comprise electrical contacts that have springs or other elements to ensure that the contacts protrude out beyond the surface of each support bar and A/V component housing to which the contacts are affixed. When a support bar is moved to an adjacent support bar or is interlocked with an A/V component, the contacts from one device physically touches the contacts from the other device, and the contacts retract slightly from their outward positions. This ensures that the contacts touch each other so that the power and control signals may be transferred between the support bars and between the support bars and the A/V components. In other embodiments however, spring-like elements are not required and the contacts do not extend beyond the surfaces of the support bars and A/V component housings.

While the illustrated embodiment shows two electrical buses, i.e., one for a power signal and one for a control signal, alternative embodiments can employ a greater number of buses, or alternatively, only one electrical bus that supplies both the power and control signals, such as via a power line communications ("PLC") network.

Thus it can be appreciated that by using two or more support bars with the same general design, such as the support bars designated by reference numerals 102, 102a, 102b in FIG. 4, a user can attach them to a support surface adjacent to one another thereby effectively forming a continuous ledge having a continuous channel, such as the channel 106 of FIG. 1, and effectively having two continuous electrical buses. For a uniform and aesthetically-pleasing appearance, the support bars have generally the same appearance, so that each support bar has a cross-section profile that is generally the same as that of the other support bars. Similarly, the A/V components have generally the same appearance, so that each A/V component has a cross-section profile that is generally the same as that of the other A/V components.

Figure 6:
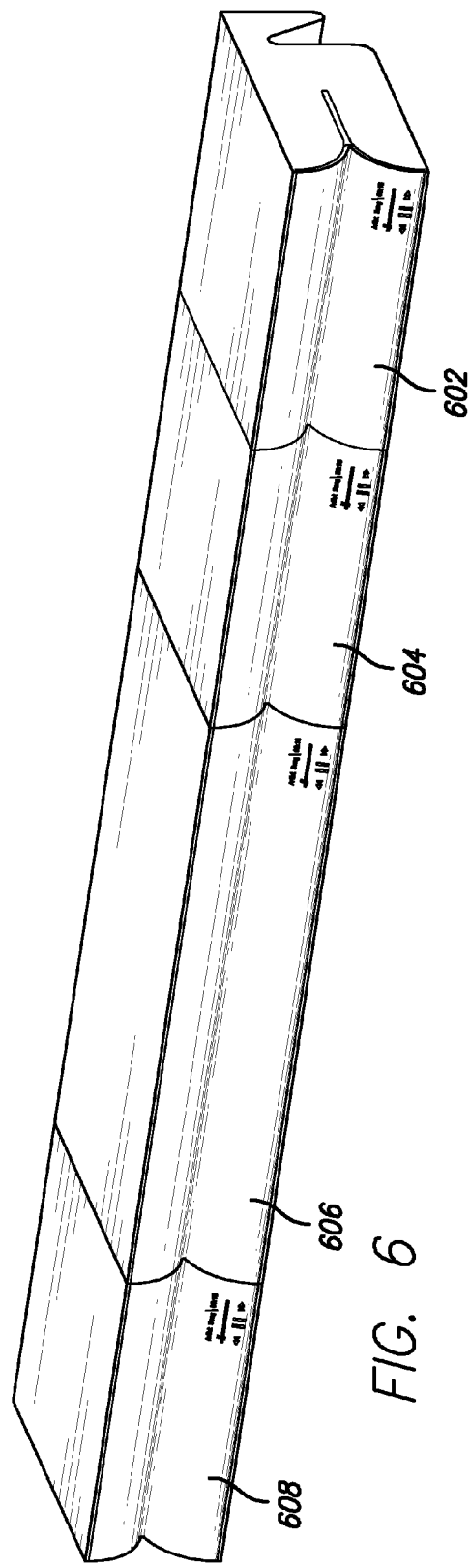
FIG. 6 is a diagram of a plurality of A/V components according to another embodiment of the invention.

FIG. 6 shows a plurality of A/V components 602, 604, 606, 608 disposed adjacent to one another. Although each A/V component has a generally different function, they have the same general appearance, so that each has a cross-section profile that is generally the same as that of the other. This provides an aesthetically-pleasing appearance with no visible, external cables running between the A/V components 602, 604, 606, 608 or running from the A/V components 602, 604, 606, 608 to the support bars. Moreover, with this arrangement the A/V components 602, 604, 606, 608 can be operationally mated with the channels of any of the support bars so that the components are supported by the support bars and electrically connected to each other and to a power supply via the electrical buses. Advantageously, the A/V components can be interchangeably mated with the support bars, so that they can be quickly and easily re-arranged on the support bars in any order by the user while retaining their operability and without the use of external cables or additional fastening devices.

Thus it can be seen that by this arrangement, the A/V components receive power and control signals (including A/V content data) via the support bars and electrical buses housed within. Specifically, any two or more support bars transmit the control signal and the power signal between one another when they are attached to the structure surface and disposed adjacent to one another. Regardless of whether an A/V component is mounted on a first or second support bar, the A/V component can receive the control signal and power signal via the support bars due to the uniformity of placement of conductive surfaces on both the A/V component and the support bars.

Figure 7:
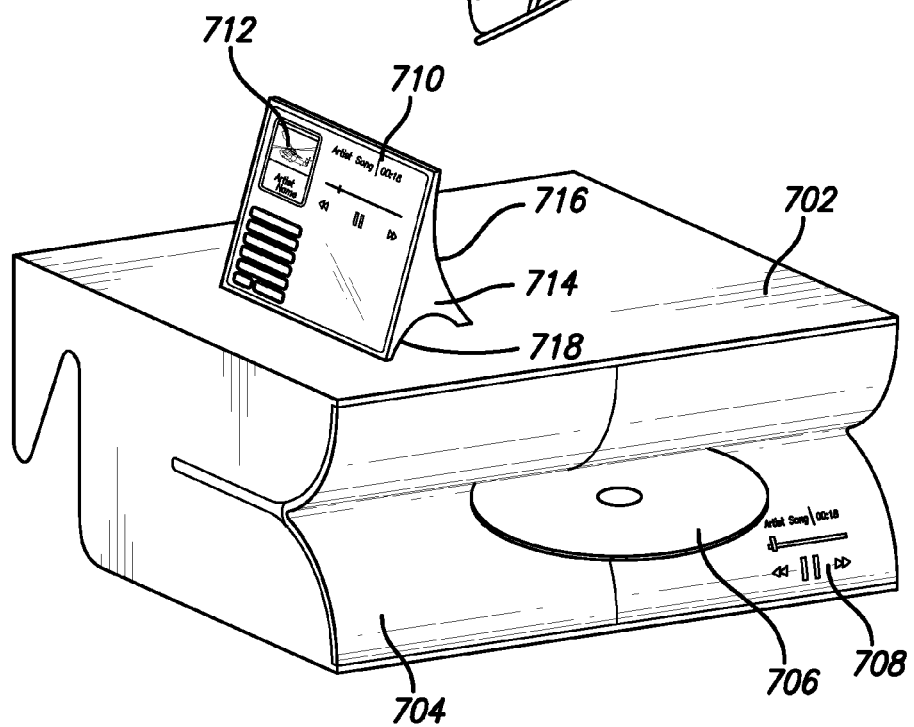
FIG. 7 is a diagram of a CD player and remote controller according to another embodiment of the invention.

As previously mentioned, the A/V components can have differing functions and can include a digital video recorder, a DVD player, an amplifier, a speaker, a television or radio tuner, an LCD display, an A/V controller, a CD player, etc. For example FIG. 7 shows an A/V component that is a CD player 702. The CD player 702 has a concave-shaped front face 704 which is advantageously configured to receive a CD 706 for playing A/V content. The front face 704 further includes a touchscreen 708 having icons for use in controlling the operation of the CD player 702.

Sitting atop the CD player 702 is a remote controller 710 for wirelessly transmitting commands for operating the CD player 702 as well as operating a plurality of other A/V components (not shown in FIG. 7) that may be included in an A/V system. The remote controller 710 has a display screen 712 for displaying a user interface. The controller 710 further has a protruding rear portion 714 formed by a concave-shaped upper surface 716 and a concave-shaped lower surface 718. Because the controller rear portion 714 protrudes from the back of the controller 710, the rear portion 714 allows the controller 710 to rest on any horizontal surface in a generally upright position to facilitate the viewing of the display screen 712.

Figure 8:
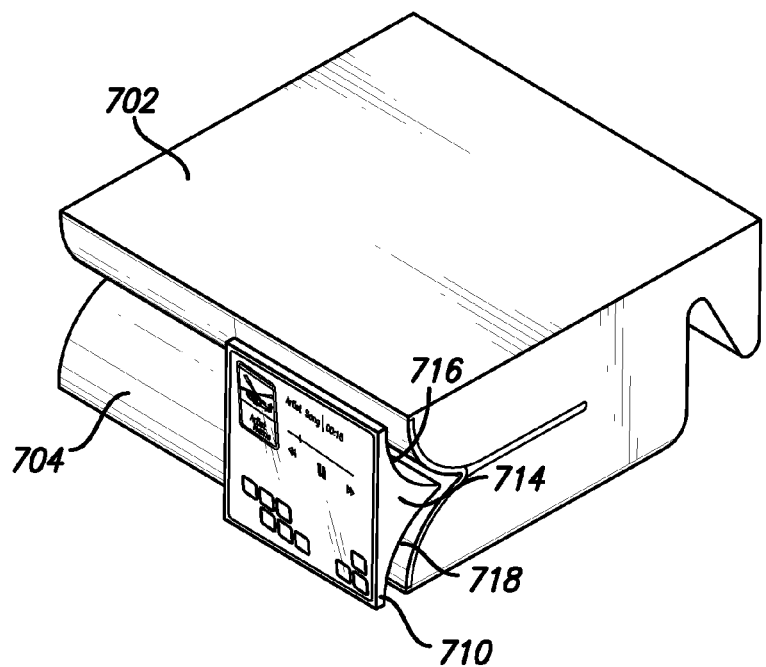
FIG. 8 is another view of the CD player and remote controller of FIG. 7.

As best seen in FIG. 8, the upper and lower surfaces 716, 718 of the controller rear portion 714 conform to the concave-shaped profile of the CD player front face 704. This configuration permits the remote controller 710 to mate within the CD player front face 704, or the front face of any other A/V component housing, for convenient storage. While in such a stored location, the remote controller 710 can be recharged by the CD player 702, or alternatively by another A/V component, via inductive charging.

Figure 9:
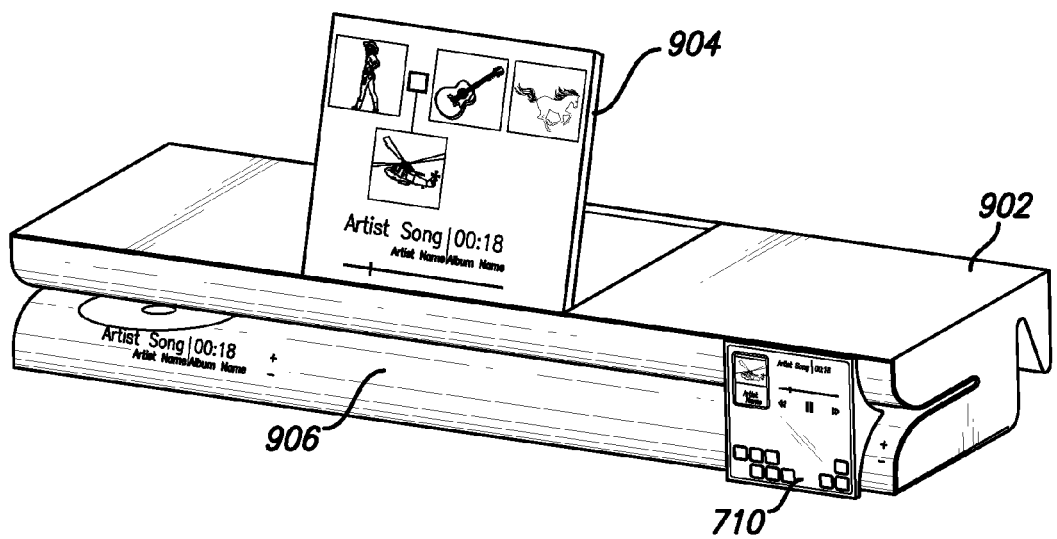
FIG. 9 is a diagram of a combined CD player and system controller according to another embodiment of the invention.

Referring now to FIG. 9, there is shown an A/V component 902 having the combined functions of a CD player and a system controller. As with any other A/V component in this system, this A/V component 902 has a concave-shaped front face 906 adapted to receive the remote controller 710. This A/V component 902 has a retractable or "pop-up" display screen 904 for displaying a user interface that can be used for controlling the operation of the A/V system, for displaying a playlist for the management of the A/V content, etc. In an alternative embodiment, the retractable display screen 904 can be included as part of a hard disk drive recorder, or as part of certain other A/V components.

Figure 10:
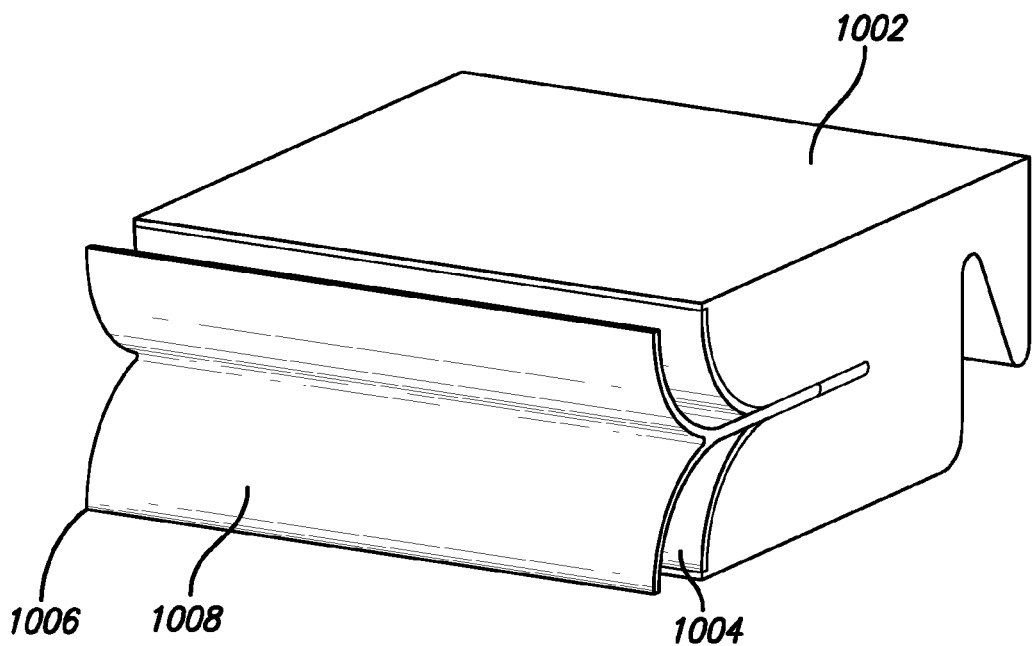
FIG. 10 is a diagram of an A/V component with a removable cover according to another embodiment of the invention.

FIG. 10 shows an A/V component 1002 with a concave-shaped front face 1004 along with a removable cover 1006. The removable cover 1006 is comprised of a decorative fabric attached to a plastic base. The cover 1006 has a concave-shaped front face 1008 and mates with the A/V component front face 1004. The cover 1006 therefore is configured to be inserted into the A/V component front face 1004 and to conform to it shape. It will be appreciated that a plurality of such removable covers having different colors and patterns can be made available at relatively low cost, thereby providing a user with the ability to choose an appropriate color or pattern for the user's A/V components, and to easily change the color or pattern, as well.

Figure 11:
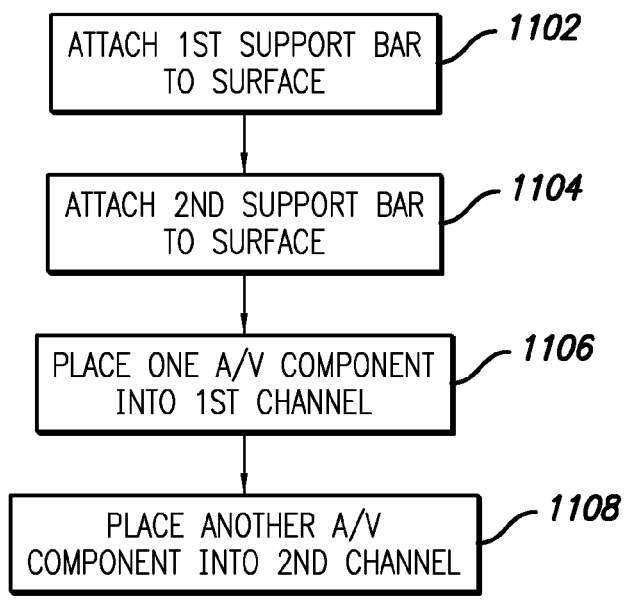
FIG. 11 is a simplified process flow diagram for a method of securing A/V components to a structure surface according to an embodiment of the invention.

FIG. 11 illustrates a method of securing A/V components to a structure surface according to an embodiment of the invention. First, a first support bar defining a first channel is attached to the structure surface. (Step 1102) Next, a second support bar defining a second channel is attached to the structure surface at a location adjacent to the first support bar so that the second support bar abuts the first support bar. (Step 1104) The first and second support bars each have two conductive surfaces configured so that the two conductive surfaces of the first support bar abut or contact the two conductive surfaces of the second support bar when the support bars are mounted on the structure surface adjacent to one another.

A portion of one A/V component having two conductive surfaces is placed into the first support bar first channel, so that these two conductive surfaces contact or abut a third and fourth conductive surface, respectively, on the first support bar. (Step 1106) Similarly, a portion of another A/V component having two conductive surfaces is placed into the second support bar second channel, so that these two conductive surfaces contact or abut a third and fourth conductive surface, respectively, on the second support bar. (Step 1108)

Figure 12:
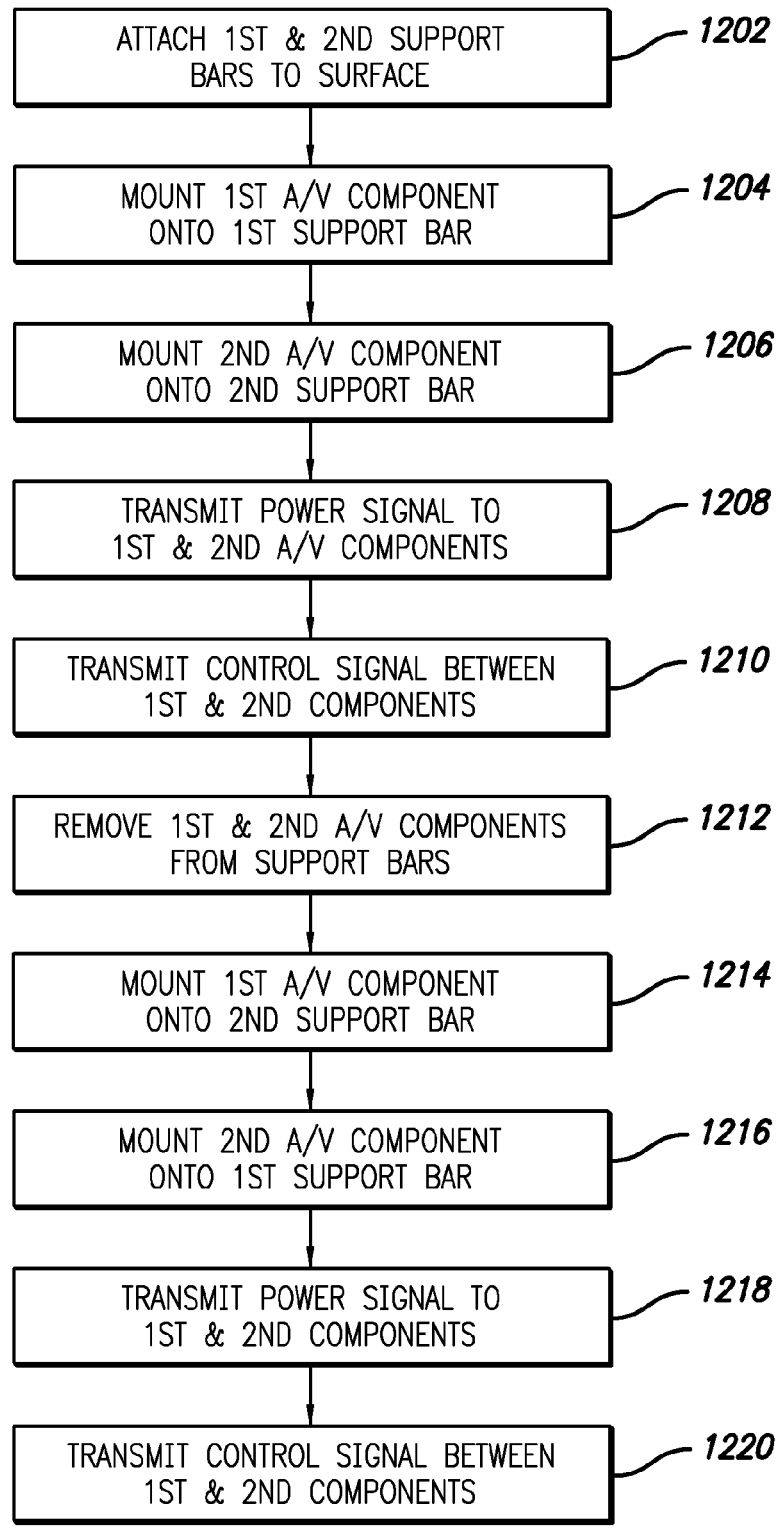
FIG. 12 is a simplified process flow diagram for a method of moving and operating A/V components according to an embodiment of the invention.

FIG. 12 illustrates a method of moving and operating A/V components according to an embodiment of the invention. First and second support bars are each attached to a structure surface, such as a wall, wherein each of the support bars defines a support bar channel. (Step 1202) Next, a first A/V component is mounted onto the first support bar (Step 1204), and a second A/V component is mounted on the second support bar (Step 1206), wherein each of the A/V components has a hook-shaped portion adapted to mate with the support bar channel of either of the support bars. A power signal is transmitted to the first and second A/V components via the first and second support bars. (Step 1208) Next, a control signal is transmitted between the first A/V component and the second A/V component via the first and second support bars. (Step 1210)

In order to re-arrange the A/V components, the first and second A/V components are removed from the first and second support bars. (Step 1212) Then the first A/V component is mounted on the second support bar (Step 1214) and the second A/V component is mounted on the first support bar (Step 1216). The power signal is again transmitted to the first and second A/V components via the support bars (Step 1218). Finally, a control signal (including A/V content data) is transmitted between the first A/V component and the second A/V component via the support bars. (Step 1220)

Thus it can be seen that embodiments of the invention permit A/V components to receive power and transmit control signals (including A/V content data) via the support bars and electrical buses housed within. Any two or more support bars transmit the control signal and the power signal between one another when they are attached to a structure surface adjacent to one another. Regardless of whether an A/V component is mounted on a first or second support bar, the A/V component can receive the control signal and power signal via the support bars due to the uniformity of placement of conductive surfaces on both the A/V component and the support bars. This provides easy system expandability by simply attaching additional support bars adjacent to existing support bars and adding additional A/V components as desired.

This ease of expandability includes the sales of these items by a manufacturer. Each A/V component can be sold with a support bar bundled with the A/V component and having a width dimension that matches the width of the A/V component. Thus a consumer does not need to worry about locating and purchasing a support bar separately, thereby making it easy for the consumer to have ready access to the parts necessary for expansion and use of an A/V system.

Advantages of embodiments of the invention include the use of A/V components in more than one room. For example, support bars can be mounted in more than one room or location, and certain of the A/V components can easily be carried from room to room and mounted on a support bar as needed. The A/V components can include one or more speakers that are adapted to receive A/V content data both via a bus in a support bar or wirelessly. Thus a user can carry the speakers from one room where the other A/V components are mounted to another room where only the speakers are used. The speakers can wirelessly receive the A/V content data and play the A/V content for the user while in the other room. In yet an alternative embodiment, the speakers could receive the A/V content data in the other room via a power line communications (PLC) network.

Further advantages include the use of the support bars with a home server. An external cable can be used to connect a home server with a data bus located within a support bar. (Alternatively, a PLC network or a wireless connection may be used.) Once connected to the data bus of one support bar, all A/V components would thereby have a data connection to the server.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. An audio-visual ("A/V") component for use with A/V content and for use with a support bar having a support bar conductive surface, wherein the support bar defines a channel and is adapted for attachment to a structure surface, the A/V component comprising:
   a housing having a hook-shaped portion adapted to mate with the channel, wherein the housing is configured to be supported by the support bar when the hook-shaped portion is mated with the channel and when the support bar is attached to the structure surface;
   a component first conductive surface disposed on the housing and adapted to abut the support bar conductive surface when the hook-shaped portion is mated with the channel; and
   electronic circuitry disposed within the housing and electrically connected to the component first conductive surface, wherein the electronic circuitry is for processing a control signal for using the AN content,
   wherein the component first conductive surface and the support bar conductive surface are adapted to transmit one of a power signal and the control signal.

2. The A/V component of claim 1 wherein the A/V component is one of a digital video recorder, a DVD player, an amplifier, a speaker, a television tuner, an A/V controller, and a CD player.

3. The A/V component of claim 1 wherein the support bar is a first support bar, wherein the A/V component is further for use with a second support bar having a second support bar conductive surface,
   wherein the second support bar defines a second channel and is adapted for attachment to the structure surface,
   wherein the first and second support bars are adapted to transmit the one of the power signal and the control signal between one another when the first and second support bars are attached to the structure surface and disposed adjacent to one another,
   wherein the hook-shaped portion of the housing is adapted to mate with the second channel, and the housing is configured to be supported by the second support bar when the hook-shaped portion is mated with the second channel and when the second support bar is attached to the structure surface,
   wherein the component first conductive surface is adapted to abut the second support bar conductive surface when the hook-shaped portion is mated with the second channel, and
   wherein the component first conductive surface and the second support bar conductive surface are adapted to transmit the one of the power signal and the control signal.

4. The A/V component of claim 1 wherein the housing has an exterior and an interior, and wherein no electrical cable extends from the housing exterior when the housing is supported by the support bar and when the electronic circuitry is processing the control signal.

5. The A/V component of claim 1 wherein the support bar conductive surface is a support bar first conductive surface, wherein the support bar further has a support bar second conductive surface, the A/V component further comprising:
   a component second conductive surface disposed on the housing and adapted to abut the support bar second conductive surface when the hook-shaped portion is mated with the channel,
   wherein the electronic circuitry is further connected to the component second conductive surface, and
   wherein the component second conductive surface and the support bar second conductive surface are adapted to transmit the other one of the power signal and the control signal.

6. A system for using audio-visual ("A/V") content and for use with a plurality of support bars, wherein each of the plurality of support bars has a support bar first conductive surface, wherein each of the plurality of support bars defines a support bar channel and is adapted for attachment to a structure surface, the system comprising:
   a plurality of A/V components wherein each of the plurality of A/V components is adapted to perform a generally different function than any other of the plurality of A/V components, and wherein each of the plurality of A/V components comprises:
     a housing having a hook-shaped portion adapted to mate with each of the plurality of support bar channels, wherein the housing is configured to be supported by any one of the plurality of support bars when the hook-shaped portion is mated with the corresponding one of the plurality of support bar channels and when the one of the plurality of support bars is attached to the structure surface;
     a component first conductive surface disposed on the housing and adapted to abut any one of the plurality of support bar first conductive surfaces when the hook-shaped portion is mated with the corresponding one of the plurality of support bar channels; and electronic circuitry disposed within the housing and electrically connected to the component first conductive surface, wherein the electronic circuitry is for processing a control signal for using the A/V content, wherein the component first conductive surface and each of the plurality of support bar first conductive surfaces are adapted to transmit one of a power signal and the control signal.

7. The system of claim 6 wherein the plurality of support bars includes a first support bar and a second support bar, wherein the plurality of A/V components includes a first A/V component and a second A/V component, wherein the one of the power signal and the control signal is the control signal, wherein the first support bar is adapted to transmit the control signal to the second support bar when the first and second support bars are attached to the structure surface and disposed adjacent to one another, wherein the first A/V component is adapted to transmit the control signal to the second A/V component via the first and second support bars when the hook-shaped portion of the first A/V component housing is mated with the first support bar channel and when the hook-shaped portion of the second A/V component housing is mated with the second support bar channel, and wherein the first A/V component is adapted to transmit the control signal to the second A/V component via the first and second support bars when the hook-shaped portion of the first A/V component housing is mated with the second support bar channel and when the hook-shaped portion of the second A/V component housing is mated with the first support bar channel.

8. The system of claim 6 wherein each of the plurality of support bars further has a support bar second conductive surface, and wherein each of the plurality of A/V components further comprises:

a component second conductive surface disposed on the housing and adapted to abut any one of the plurality of support bar second conductive surfaces when the hook-shaped portion is mated with the corresponding one of the plurality of support bar channels, wherein the component second conductive surface and each of the plurality of support bar second conductive surfaces are adapted to transmit the other one of the power signal and the control signal.

9. The system of claim 8 wherein the plurality of support bars includes a first support bar and a second support bar, wherein the plurality of A/V components includes a first A/V component and a second A/V component, wherein the first and second support bars are adapted to transmit the control signal and the power signal between one another when the first and second support bars are attached to the structure surface and disposed adjacent to one another, wherein the first A/V component is adapted to receive the power signal from at least one of the first and second support bars and further is adapted to transmit the control signal to the second A/V component via the first and second support bars when the hook-shaped portion of the first A/V component housing is mated with the first support bar channel and when the hook-shaped portion of the second A/V component housing is mated with the second support bar channel, and wherein the first A/V component is adapted to receive the power signal from at least the other one of the first and second support bars and further is adapted to transmit the control signal to the second A/V component via the first and second support bars when the hook-shaped portion of the first A/V component housing is mated with the second support bar channel and when the hook-shaped portion of the second A/V component housing is mated with the first support bar channel.

10. The system of claim 6 wherein the housing has a front face and a rear face, wherein the rear face includes the hook-shaped portion of the housing, and wherein the front face has a concave shape.

11. The system of claim 10 wherein the concave-shaped front face is formed by an upper surface and a lower surface, and wherein the upper surface and the lower surface each has cross section that defines an approximately 90-degree arc of an imaginary circle.

12. The system of claim 10 wherein each of the plurality of A/V components further comprises a removable cover configured to be secured to at least a portion of the front face of the housing and to conform to the shape of the at least a portion of the front face.

13. The system of claim 6 wherein the support bar channel extends in a generally longitudinal direction, wherein the housing defines a housing channel having a channel wall, wherein the hook-shaped portion of the housing defines at least a portion of the channel wall, and wherein the hook-shaped portion and the housing channel are configured to form a handle for carrying the A/V component.

14. The system of claim 6 wherein a first one of the plurality of the A/V components is a first one of a digital video recorder, a DVD player, an amplifier, a speaker, a television tuner, an A/V controller, and a CD player, and wherein a second one of the plurality of the A/V components is a second one of the digital video recorder, the DVD player, the amplifier, the speaker, the television tuner, the A/V controller, and the CD player.

15. The system of claim 6 wherein one of the plurality of the A/V components is a controller with a retractable display screen for displaying a user interface, and wherein the user interface includes a playlist for management of the A/V content.

16. The system of claim 6 wherein one of the plurality of the A/V components is a hard disk drive recorder with a retractable display screen for displaying a user interface, and wherein the user interface includes a playlist for management of the A/V content.

17. The system of claim 6 further comprising a remote controller for wirelessly transmitting commands for operating the plurality of A/V components.

18. The system of claim 17 wherein the remote controller has a display screen for displaying a user interface.

19. The system of claim 17 wherein the A/V component housing has a front face and a rear face, wherein the rear face includes the hook-shaped portion of the housing, wherein the front face has a concave shape, and wherein the remote controller is configured to be secured to the front face.

20. A method comprising:

attaching a plurality of support bars to a structure surface, wherein each of the plurality of support bars defines a support bar channel and has a support bar first conductive surface;

mounting a plurality of audio-visual ("A/V") components onto the plurality of support bars, wherein each of the plurality of A/V components has a hook-shaped portion adapted to mate with the support bar channel of any one of the plurality of support bars;

wherein each of the plurality of A/V components has a component first conductive surface disposed on the A/V component and adapted to abut the support bar first conductive surface of any one of the plurality of support bars when the A/V component is mounted on the one of the plurality of support bars, and wherein each of the plurality of A/V components further has electronic circuitry electrically connected to the component first conductive surface, wherein the electronic circuitry is for processing a control signal for using A/V content; and transmitting one of a power signal and the control signal between the component first conductive surface of one of the plurality of A/V components and the support bar first conductive surface of one of the plurality of support bars.

21. The method of claim 20 wherein the plurality of A/V components includes a first A/V component and a second A/V component, wherein the plurality of support bars includes a first support bar defining a first support bar channel and a second support bar defining a second support bar channel, and wherein mounting the plurality of A/V components includes mounting the first A/V component onto the first support bar and mounting the second A/V component onto the second support bar, the method further comprising:

removing the first A/V component from the first support bar;

removing the second A/V component from the second support bar;

mounting the first A/V component onto the second support bar;

mounting the second A/V component onto the first support bar; and transmitting the control signal between the first A/V component and the second A/V component via the first and second support bars when the first A/V component is mounted on the second support bar and the second A/V component is mounted on the first support bar.

22. The method of claim 20, wherein each of the plurality of support bars further has a support bar second conductive surface, wherein each of the plurality of A/V components further has a component second conductive surface disposed on the A/V component and adapted to abut the support bar second conductive surface of any one of the plurality of support bars when the A/V component is mounted on the one of the plurality of support bars, the method further comprising:

transmitting another one of the power signal and the control signal between the component second conductive surface of the one of the plurality of A/V components and the support bar second conductive surface of the one of the plurality of support bars.

23. The method of claim 22 wherein the plurality of A/V components includes a first A/V component and a second A/V component, wherein the plurality of support bars includes a first support bar defining a first support bar channel and a second support bar defining a second support bar channel, and wherein mounting the plurality of A/V components includes mounting the first A/V component onto the first support bar and mounting the second A/V component onto the second support bar, the method further comprising:

removing the first A/V component from the first support bar;

removing the second A/V component from the second support bar;

mounting the first A/V component onto the second support bar;

mounting the second A/V component onto the first support bar;

transmitting the control signal between the first A/V component and the second A/V component via the first and second support bars when the first A/V component is mounted on the second support bar and the second A/V component is mounted on the first support bar; and transmitting the power signal to the first and second A/V components when the first A/V component is mounted on the second support bar and the second A/V component is mounted on the first support bar, wherein the first and second support bars are adapted to transmit the control signal and the power signal between one another.

24. The method of claim 20 wherein a first one of the plurality of the A/V components is a first one of a digital video recorder, a DVD player, an amplifier, a speaker, a television tuner, an A/V controller, and a CD player, and wherein a second one of the plurality of the A/V components is a second one of the digital video recorder, the DVD player, the amplifier, the speaker, the television tuner, the A/V controller, and the CD player.

\* \* \* \* \*

UNITED STATES PATENT AND TRADEMARK OFFICE
CERTIFICATE OF CORRECTION

PATENT NO.        : 8,002,560 B2                                    Page 1 of 1
APPLICATION NO.   : 11/557951
DATED             : August 23, 2011
INVENTOR(S)       : Arie et al.

It is certified that error appears in the above-identified patent and that said Letters Patent is hereby corrected as shown below:

In the CLAIMS:
Claim 1, column 9, line 60, delete "AN" and insert --A/V--.
Claim 20, column 12, line 63, delete "("AN")" and insert --("A/V")--.

Signed and Sealed this
Twentieth Day of December, 2011

David J. Kappos
*Director of the United States Patent and Trademark Office*